July 27, 1926.  
J. M. MacLACHLAN  
1,594,064  
APPARATUS FOR FINELY DIVIDING AND DRYING FLUID SUBSTANCES  
Filed Jan. 19, 1922  
2 Sheets-Sheet 1
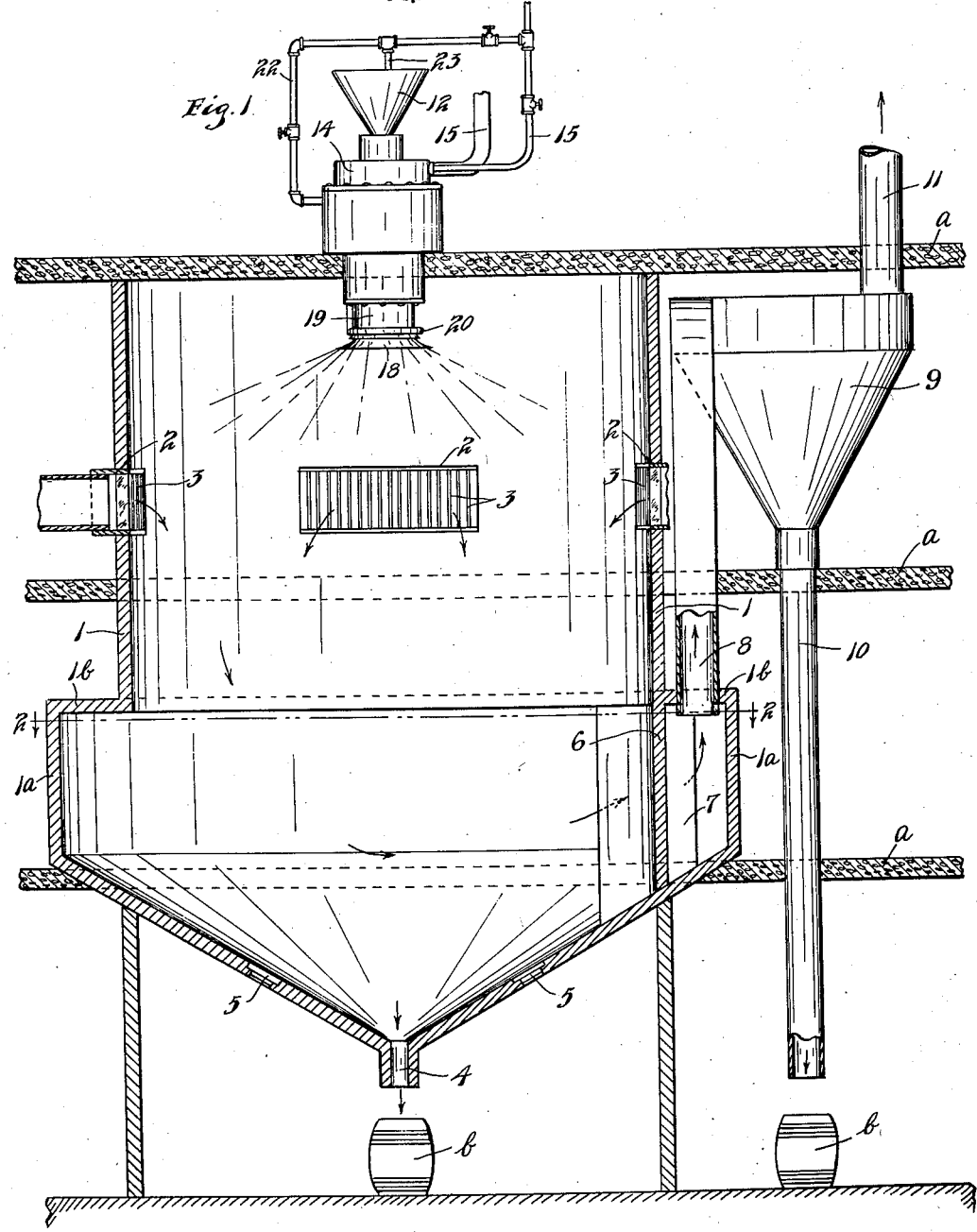
INVENTOR.  
JOHN M. MacLACHLAN  
BY HIS ATTORNEY.

July 27, 1926. 1,594,064
J. M. MacLACHLAN
APPARATUS FOR FINELY DIVIDING AND DRYING FLUID SUBSTANCES
Filed Jan. 19, 1922 2 Sheets-Sheet 2
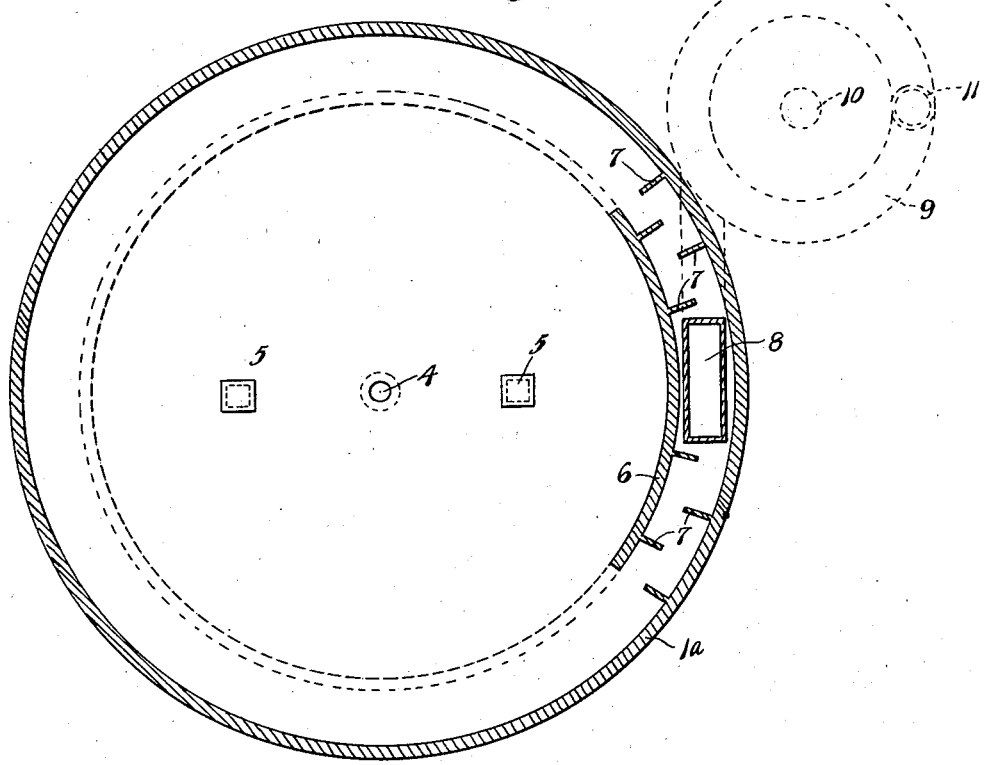
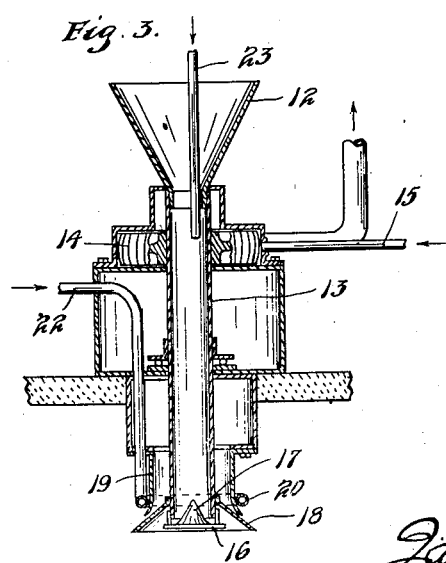
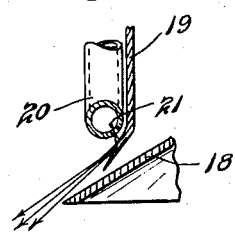
INVENTOR.
JOHN M. MacLACHLAN.
BY HIS ATTORNEY.

Patented July 27, 1926.

1,594,064

UNITED STATES PATENT OFFICE.

JOHN M. MacLACHLAN, OF WEST ALLIS, WISCONSIN.

APPARATUS FOR FINELY DIVIDING AND DRYING FLUID SUBSTANCES.

Application filed January 19, 1922. Serial No. 530,488.

This invention relates to a drying apparatus and particularly to such an apparatus adapted to dry heavy liquid substances such as cooked cereal or ground and pulped meat. One of the uses of the improved apparatus is to produce a dry flour-like cereal food made by drying the thoroughly cooked cereal. While one use of the apparatus relates particularly to oat meal, it, of course, can be used with various other cereals, such as barley, wheat, and the various products made therefrom. A thoroughly cooked cereal, after passing through the apparatus is in the form of a dry flour-like material which can be almost immediately prepared for eating by simply adding thereto boiling water.

It is an object of this invention to provide an apparatus including a closed cabinet constructed to have a hot drying medium passed thereinto and to provide centrifugal distributing means for the material to be dried at the top of the cabinet.

It is also an object of the invention to provide a disintegrating and scattering means in connection with the centrifugal distributer, by means of which a hot fluid is projected against the material as such material is thrown outwardly by the centrifugal distributer in a thin umbrella-like shower.

It is a further object of the invention to introduce the material to the centrifugal distributer through a rapidly rotating tube and to assist the passage of the material through said tube by projecting a blast of fluid downwardly through the said tube.

These and other objects and advantages of the invention will be fully set forth in the following description made in connection with the accompanying drawings in which like reference characters refer to the same parts throughout the different views, and in which:—

Fig. 1 is a view in vertical section through the drying cabinet showing the distributing and disintegrating means in side elevation;

Fig. 2 is a horizontal section taken on the line 2—2 of Fig. 1;

Fig. 3 is a vertical central section through the distributing apparatus; and

Fig. 4 is a fragmentary vertical section on an enlarged scale illustrating the action of the disintegrator and scattering means.

Referring to the drawings, a drying cabinet comprising the walls 1 is illustrated, which cabinet is preferably cylindrical. This cabinet is of considerable height and, as illustarted, is adapted to occupy the space between several floors $a$ of a building. Somewhat adjacent its top, the cabinet is provided with spaced openings 2 extending for a short distance circumferentially about the wall, which openings are provided with spaced vertical shutters 3, preferably adjustably mounted to be set at different inclinations. The lower part of the cabinet is enlarged, as shown at $1^a$ and the cabinet terminates in a conical base having a central discharge outlet 4, the bottom of said base being provided with spaced manholes 5 forming means for entry into the cabinet. Adjacent one side of the cabinet, a partition 6 of semi-cylindrical shape extends downwardly substantially in alinement with the wall 1 to the base of the cabinet and in the space between this partition and the outer wall $1^a$ are disposed a plurality of baffle plates 7 projecting into the space from the partition and the wall $1^a$, these baffle plates preferably being in staggered relation. The projecting wall $1^a$ forms a ledge or horizontal projection $1^b$ in the cabinet and at a point substantially centrally of the partition 6 an outlet conduit 8 extends upwardly from the horizontal portion $1^b$ and is connected to and communicates with a cyclone separating device 9 formed as a downwardly converging cone having a central discharge conduit 10. An outlet conduit 11 for the air or gas from the separater is also shown. This cyclone separator is of any well known type of such apparatus and need not be further described.

The material to be dried will be contained in a vat or other suitable means and regularly fed into a funnel 12 secured to the upper end of a rotary tube 13 carried in suitable bearings located and supported on the upper floor $a$. This tube is adapted to be rotated at high speed and for this purpose, has connected thereto the rotor of a steam turbine 14 to which steam is supplied through a steam pipe 15 which will be connected with any suitable source of steam supply. The tube 13, at its botom end, carries a distributing plate 16 having thereon an upwardly projecting cone 17, the pointed end of which projects upwardly into the bottom of tube 13. Secured to the lower end of the tube and surrounding the plate 16 is a disk 18 concave on its lower side. An annular shield 19 depends from a suitable bracket and has its lower edge somewhat sharpened and flaring outwardly above and adjacent the outer edge of the disk 18 and an annular steam pipe 20 extends about this shield 19 adjacent its lower flaring edge. This pipe 20 is provided with a large number of small holes 21, as shown in Fig. 4, through which steam is adapted to be projected against the flaring portion of the shield 19 and thence deflected outwardly and downwardly about the edge of the disk 18. Steam is supplied to the pipe 20 through the pipe 22 which will also be connected to any suitable source of steam supply. Another steam pipe 23 is, likewise connected to a steam supply and extends downwardly through the hopper 12 and a short distance into the tube 13.

In operation, the material will, as stated, be regularly fed into the hopper 12 and will pass downwardly through the tube 13 which will be rotated at very high speed by the turbine 14. The material will strike the cone 17 and be spread upon the plate 16 from whence it will be thrown outwardly with great force against the disk 18. The material will be spread upon the latter disk and projected centrifugally outwardly and downwardly therefrom in an umbrella-like shower and in a thin film. It has been found in experiments that the rapidly rotating tube 13 tends to draw air upwardly therethrough which appreciably impedes the progress of the material through said tube. In order to overcome the tendency of the material to become clogged or stopped, the pipe 23 is provided through which a blast of steam is projected downwardly through said tube. This keeps the material moving therethrough in a uniform stream. The various steam pipes 15, 22 and 23, will be provided with suitable controlling valves, as shown in Fig. 1.

Steam, preferably superheated, will be introduced through the steam pipe 22 and this steam will issue in a multitude of small jets from the pipe 20 against the flaring edge of the shield 19 from which it will be deflected outwardly in a substantial continuous spray or film around the edge of the disk 18. This film or shower of highly heated steam will pass through the projected film of material and will act to efficiently scatter the same and also to break up or disintegrate and separate the particles of such material. Heated air will be continuously introduced under suitable pressure through the opening 3 into the cabinet. The projected material will fall through the heated air and will be rapidly dried so that by the time it reaches the bottom of the cabinet it will be in the form of a fine dry flour-like powder. A rotating action resulting from the centrifugal rotating distributer and the introduction of air into the cabinet, some of the finer material will be held in suspension in this air current. The outlet for the air, as described is between the partitions 6 and the wall 1ª and the air in passing outwardly encounters the baffles 7 so that some of the material carried thereby will be precipitated. The air issuing from the cabinet passes through the conduit 8 and is preferably passed through the cyclone separator 9 where practically all of the suspended material is separated therefrom. The dry material falling to the bottom of the cabinet will be discharged through the outlet 4 and received in suitable barrels or receptacles $b$ and the material discharged from the cyclone separator through the conduit 10 will, likewise, be received in similar barrels $b$.

From the above description it is seen that applicant has provided an effective apparatus for rapidly drying heavy fluid or semifluid substances. The substances are rapidly dried and are removed from the apparatus, as stated, in the form of dry powder. One great result attained with the use of such an apparatus is that the materials can be dried thoroughly and rapidly in such manner as to retain their original flavor, which flavor is usually lost or so changed as to be objectionable in a slow drying or sun drying process. This apparatus can be used for drying various substances, and while particularly adapted for drying cereals, ground meat pulp and other heavy liquid subtances, is also efficient for drying many other liquid or semi-liquid materials.

It will, of course, be understood that various changes may be made in the form, arrangement and details of construction without departing from the scope of applicant's invention, which, generally stated, consists in the matter shown, described, and set forth in the appended claims.

What is claimed is:—

1. A drying apparatus for fluid or semifluid material comprising a cabinet adapted to receive a hot drying medium, a feeding conduit for said material leading into the same at the top thereof, means for centrifugally distributing the material at the lower end of said conduit, and means in the upper portion of said conduit for projecting a fluid downwardly into said conduit.

2. A drying apparatus for fluid or semifluid material comprising a cabinet adapted to receive a hot drying medium, a feeding conduit for said material leading into the same at the top thereof, means for centrifugally distributing the material at the lower end of said conduit, said means being disposed concentrically with said conduit and a steam pipe projecting downwardly into said conduit for projecting steam thereinto and assist in the feeding of the material.

3. A drying apparatus having in combination a cabinet, inlets in the sides thereof constructed and arranged to have a hot drying medium projected therethrough, means for centrifugally spraying the material to be dried in the cabinet at the upper end thereof, means above said means for projecting fluid downwardly for disintegrating said material, said cabinet having a discharge outlet at its lower end and an outlet for the drying medium and material suspended therein at one side, above said discharge outlet and below said inlets and a means for further separating said drying medium and material with which said latter outlet communicates.

In testimony whereof I affix my signature.

JOHN M. MacLACHLAN.